Nov. 8, 1932.    N. L. CAUSAN    1,886,940

NONWARPING CHASSIS FOR AUTOMOBILE VEHICLES AND THE LIKE

Filed April 22, 1930

Patented Nov. 8, 1932

1,886,940

UNITED STATES PATENT OFFICE

NÉMORIN LAURENT CAUSAN, OF SURESNES, FRANCE

NONWARPING CHASSIS FOR AUTOMOBILE VEHICLES AND THE LIKE

Application filed April 22, 1930, Serial No. 446,353, and in France October 17, 1929.

The present invention has for its object a chassis for automobile and other vehicles which is subjected to no torsion couple no matter what unevenness there may be in the road surface and no matter what distribution there may be of the load upon the wheels.

Figure 1:
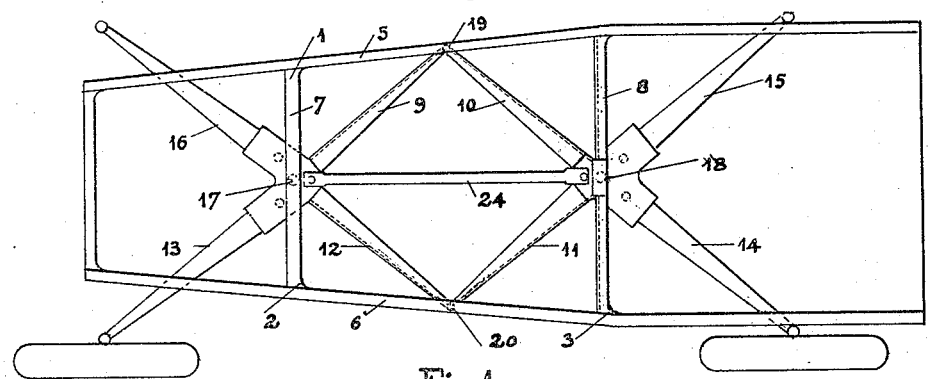
Fig. 1 shows in plan the preferred method of construction.
Figure 2:
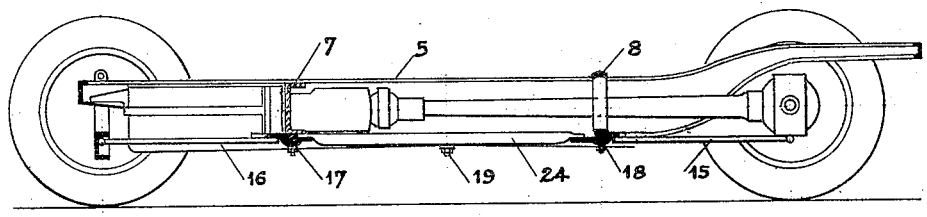
Fig. 2 is a longitudinal section of the chassis.

Reference is first had to Figs. 1 and 2.

The assembly of the chassis comprises two distinct groups of parts:

(1) The chassis itself consisting essentially of a central frame 1, 2, 3, 4 formed by the longerons 5 and 6 of the frame ordinarily employed and two cross members 7 and 8 suitably disposed.

(2) A chassis of lozenge shape 9, 10, 11, 12 carrying the suspension springs 13, 14, 15, 16 and secured below the chassis proper by two ball joints 17 and 18 and two nuts 19 and 20 arranged at the middle of the sides of the central frame.

The essential condition so that the torsional couples produced by bad distribution of the load on the wheels shall be nil, is that the points of attachment of the springs to the axles shall be situated, in plan, on the prolongation of the straight lines which join the middles of the adjacent sides of the central frame 1, 2, 3, 4.

To demonstrate that with such an arrangement the non-warping of the chassis is obtained independently of the rigidity of the members which constitute it, it will be supposed that it is supported only by the two springs 13 and 15. The assembly of the members 13 and 9 constitutes a lever whose fulcrums on the chassis proper—viz 5—6 are at 17 and 19 so that the same supports at each of the points 17 and 18 an effort from the bottom towards the top and at each of the points 19 and 20 an effort from the top to the bottom.

It will now be supposed that the chassis is supported by the other two springs 14 and 16. It will be easy to understand that the forces applied respectively at 17, 18, 19 and 20 will in no way change. The chassis proper supporting the same forces applied at the same points no matter what may be the distribution of the load on the wheels is therefore naturally nonwarping.

If the points of attachment of the springs on the axles are, in plan, only approximately on the extensions of the pieces 9, 10, 11 and 12 there result weak couples which are easily borne by the rigidity of the whole of the vehicle.

The springs 13, 14, 15 and 16 preferably consist of a single blade for ease in maintenance.

This method of mounting permits of retaining the characteristic features of ordinary chassis and to facilitate the mounting.

Figure 3:
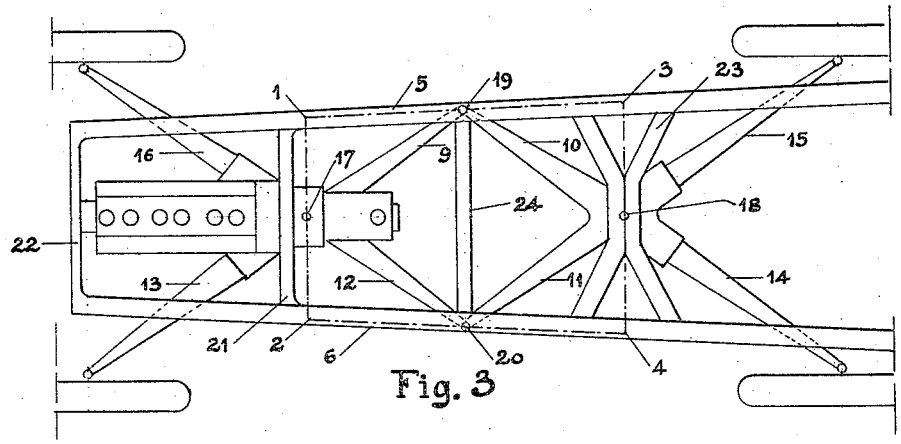
Fig. 3 shows a plan of a modification of the chassis shown in Fig. 1 in which the cross members are fixed.

In the example shown at Fig. 3 the cross members which with the longerons constitute the central chassis are fixed.

That at the front 1, 2 is replaced by two other cross members 21 and 22 connected by the motor block. For that at the back 3, 4 is substituted a St. Andrews cross 23.

The lozenge-shaped chassis is secured to the chassis proper at the middle of the side of the central frame 1, 2, 3, 4 constituted by the fixed cross members 1, 2 and 3, 4 and the parts of the longerons comprise between these fixed cross members.

A tube 24 connecting two opposite summits of the lozenge shaped chassis prevents all deformation.

Figure 4:
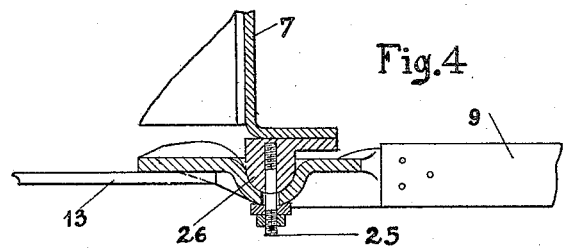
Fig. 4 shows to larger scale the details of the assembly joints.

The two ball joints 17 and 18 shown at Fig. 4 are each provided with a central stud 25 screwed into the part 26 to prevent the unintentional separation of the two frames.

To facilitate the mounting, each of the studs 19 and 20 can be replaced by two others arranged side by side and the lozenge shaped frame 9, 10, 11, 12 divided into two parts: 9 and 12 being one part and 10 and 11 the other part.

I claim:

1. A non-warping automobile and other vehicle chassis comprising a chassis proper having transverse members and longitudinal members and a lozenge shaped frame having its lateral apices secured to the longitudinal members of the chassis frame and its front and rear apices arranged under and connected to the centers of said transverse members, each such apex and each such transverse member being provided, the one with a socket portion and the other with a ball portion, forming ball joints therebetween and suspension springs attached at their inner ends to said front and rear apex portions of said lozenge shaped frame, said suspension springs being substantially in line with the side portions of said lozenge shaped frame.

2. A chassis as claimed in claim 1, in which each socket member has an opening and each ball member has a stud projecting therefrom and extending through and movable in said opening.

3. A non-warping automobile and other vehicle chassis comprising a chassis proper having transverse members and longitudinal members, and a lozenge shaped frame having its lateral apices secured to the longitudinal members of the chassis frame and its front and rear apices arranged under and connected to the centers of said transverse members.

In testimony whereof I have hereunto set my hand this 8th day of April, A. D. 1930.

NÉMORIN LAURENT CAUSAN.